(12) United States Patent
Diessner et al.

(10) Patent No.: US 7,324,407 B2
(45) Date of Patent: Jan. 29, 2008

(54) PREVENTION OF REPORTING UNWANTED SIGNALS BY THE FILTERING OF SENSOR DATA

(75) Inventors: Horst Daniel Diessner, Tamps. (MX); Matthew T. Burtch, Novi, MI (US)

(73) Assignee: Valeo Switches and Detection Systems, Auburn Hills, MI (US)

( * ) Notice: Subject to any disclaimer, the term of this patent is extended or adjusted under 35 U.S.C. 154(b) by 266 days.

(21) Appl. No.: 11/177,743

(22) Filed: Jul. 8, 2005

(65) Prior Publication Data

US 2007/0008819 A1 Jan. 11, 2007

(51) Int. Cl.
*G01S 15/93* (2006.01)
(52) U.S. Cl. .......................... 367/99; 367/909
(58) Field of Classification Search .................. 367/99, 367/909, 105; 340/904; 701/301
See application file for complete search history.

(56) References Cited

U.S. PATENT DOCUMENTS

| 6,226,226 | B1 | 5/2001 | Lill et al. |
| 6,326,886 | B1 | 12/2001 | Hoffsommer |
| 6,765,491 | B1 | 7/2004 | Nass |
| 2005/0088334 | A1* | 4/2005 | Herder .................. 342/70 |
| 2007/0008819 | A1* | 1/2007 | Diessner et al. .............. 367/99 |

FOREIGN PATENT DOCUMENTS

| DE | 198 05 515 | 8/1999 |
| DE | 103 41 128 | 3/2005 |
| DE | 103 43 175 | 4/2005 |

OTHER PUBLICATIONS

International Search Report for International Application No. PCT/US2006/026127, mailed Nov. 15, 2006, 5 pages.
Written Opinion of the International Searching Authority for PCT/US2006/026127, mailed Nov. 15, 2006, 7 pages.

* cited by examiner

*Primary Examiner*—Daniel Pihulic
(74) *Attorney, Agent, or Firm*—Osha Liang LLP

(57) ABSTRACT

A method for filtering an object by a vehicular sensor system, including emitting a first signal, detecting a first echo, the first echo including at least a portion of the first signal reflected by the object, filtering a first time value of the first echo, emitting a second signal, detecting a second echo, the second echo including at least a portion of the second signal reflected by the object, and filtering a second time value of the second echo.

19 Claims, 8 Drawing Sheets

PREVENTION OF REPORTING UNWANTED SIGNALS BY THE FILTERING OF SENSOR DATA

BACKGROUND

1. Field of the Invention

The invention relates generally to vehicular sensor systems. More specifically, the invention relates to an ultrasonic sensor system that filters unwanted signals from being reported by the system.

2. Background Art

Vehicular sensor systems are becoming increasingly popular as tools to increase driving safety, to avoid collisions with unseen objects, and to facilitate parking. As used herein, the terms "vehicle" and "vehicular" are used in their broadest sense, to encompass any means of motive transport.

An example of a prior art vehicular sensor system 100 is shown in FIG. 1. In this example, the vehicle is an automobile 102 having a sensor 104 mounted at a rear portion thereof. The sensor 104 emits ultrasonic pulses 106. If an object 108 is within detectable range of sensor 104, ultrasonic pulses are reflected by object 108 and returned as echo signals (not shown) to sensor 104. By knowing the speed of sound in air and the time for an ultrasonic pulse to travel to object 108 and an echo signal to return to sensor 104, the distance of the object to the sensor can be estimated. Accordingly, if an object is within a certain distance from automobile 102, a warning can be issued to the driver of automobile 102 to exercise due caution when reversing.

The detection range of a sensor may be shaped (i.e., expanded or contracted) depending upon different sources of noise surrounding a vehicle. For example, as a vehicle turns, the detection range of a sensor closest to the path of turning may be enlarged relative to other sensors to increase detection of objects likely to come into the path of the vehicle. Further, threshold values may be established for particular ranges of a sensor to increase or decrease the likelihood of detection of an object in those particular ranges.

SUMMARY OF INVENTION

In general, in one aspect, embodiments of the present invention relate to a method for filtering an object by a vehicular sensor system, comprising emitting a first signal, detecting a first echo, the first echo comprising at least a portion of the first signal reflected by the object, filtering a first time value of the first echo, emitting a second signal, detecting a second echo, the second echo comprising at least a portion of the second signal reflected by the object, and filtering a second time value of the second echo.

In general, in one aspect, embodiments of the present invention relate to a method for filtering an object by a vehicular sensor system, comprising emitting a first signal and a second signal from a first emitter, detecting a first echo by a first detector, the first echo comprising at least a portion of the first signal, detecting a second echo by one of the first detector and a second detector, the second echo comprising at least a portion of the second signal, detecting a plurality of objects based on detecting the first echo and detecting the second echo, and filtering at least one of the plurality of objects after detecting the plurality of objects.

In general, in one aspect, embodiments of the present invention relate to a vehicular sensor system adapted to filter an object, comprising a first emitter configured to emit a first signal, a second emitter configured to emit a second signal, at least one detector configured to detect echoes, wherein the at least one detector is configured to detect a first echo corresponding to the first signal reflected by the object, wherein the at least one detector is configured to detect a second echo corresponding to the second signal reflected by the object, and a processor system configured to filter a first time value of the first echo and a second time value of the second echo.

Other aspects of the invention will be apparent from the following description and the appended claims.

DETAILED DESCRIPTION

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the present invention relate to vehicular sensor systems. More specifically, embodiments of the present invention relate to an ultrasonic sensor system that filters unwanted signals from being reported by the system.

A vehicular sensor system detects objects that fall within a detection area of the system. However, in some cases objects may exist within the detection area that are not desired to be detected. Examples of such objects include, without limitation, trailer hitches, large bumpers, and steps that may be mounted on the vehicle. In accordance with one or more embodiments of the present invention, such unwanted objects may be filtered after being detected such that they are not reported by the system, thus avoiding a report of an unwanted detection signal. Thus, a user of a vehicular sensor system in accordance with one or more embodiments of the present invention may not receive a warning of an object that is not desired to be reported to the user.

Figure 1:
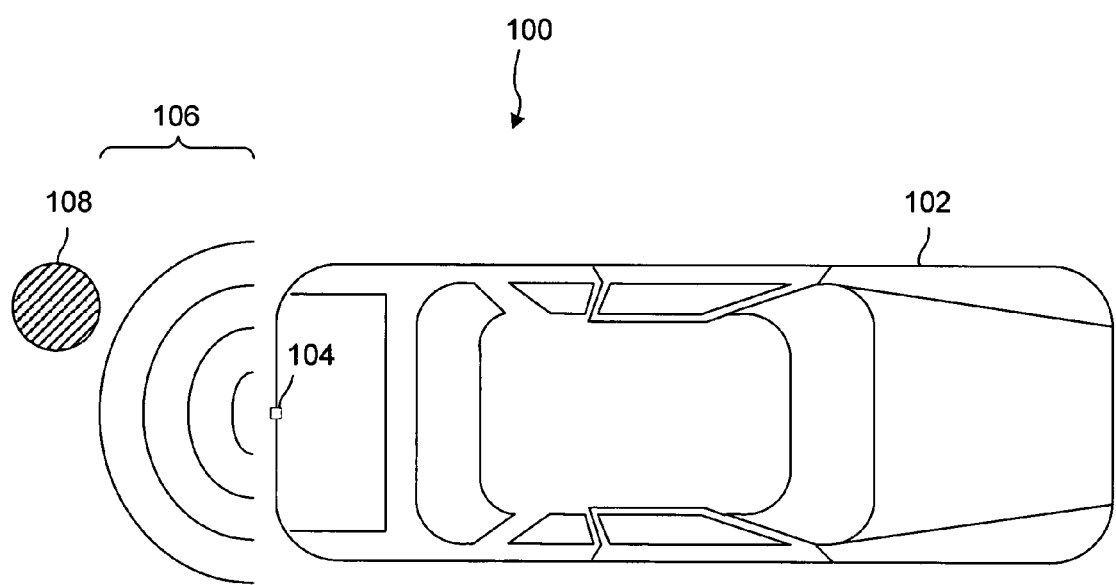
FIG. 1 shows a plan view of a prior art vehicular sensor system.
Figure 2A:
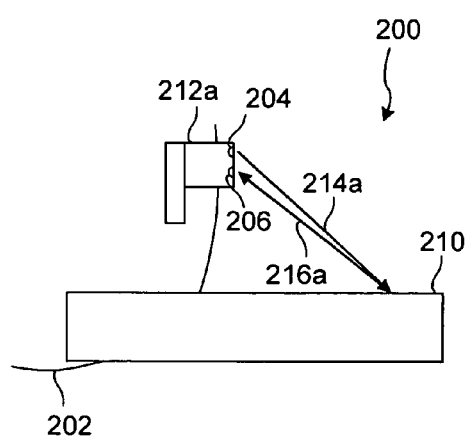
FIG. 2a shows a side view of a vehicular sensor system in accordance with an embodiment of the present invention.

FIG. 2a shows a side view of a vehicular sensor system 200 in accordance with an embodiment of the present invention. Specifically, FIG. 2a shows a side view of a sensor 212a mounted within a body of a vehicle 202. Sensor 212a emits a first signal 214a from a first emitter 204, which is reflected by object 210, and returns as a first echo 216a to sensor 212, which is detected by detector 206. Object 210 is, in this example, an object such as a large bumper attached to the vehicle.

Figure 2B:
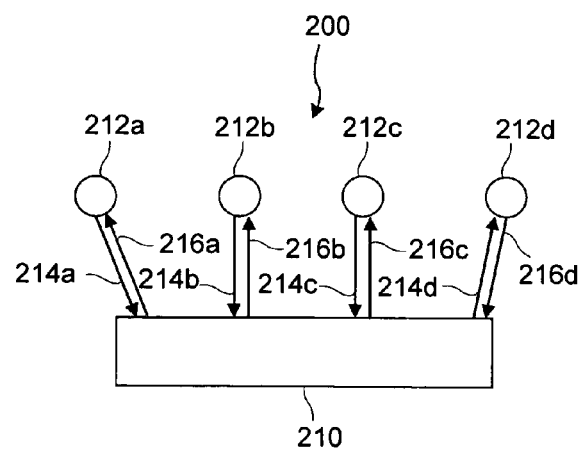
FIG. 2b shows an end view of a vehicular sensor system in accordance with an embodiment of the present invention.

FIG. 2b shows an end view of vehicular sensor system 200 in accordance with the embodiment of FIG. 2a. Specifically, FIG. 2b shows a plurality of sensors 212 emitting signals 214 and detecting echoes 216 that have been reflected by object 210. Each sensor detects an echo (e.g., 216a, 216b, 216c, 216d) that corresponds to a signal (e.g., 214a, 214b, 214c, 214d) emitted from a sensor (e.g., 212a, 212b, 212c, 212d). Each echo (e.g., 216a) corresponds to a signal (e.g., 214a) that is reflected by object 210.

As is clear from FIGS. 2a and 2b, signals that are reflected by object 210 and return as echoes to sensors 212a, 212b, 212c, 212d cause an unwanted detection of object 210 fixed to vehicle 202. Thus, filtering of such echoes is desired.

One skilled in the art will appreciate that a sensor (e.g., 212a) may use a variety of methods to send and receive signals, including, for example, ultrasonic, infrared, or laser technology. Further, one skilled in the art will appreciate that a sensor may comprise an emitter 204 and detector 206 as shown in FIG. 2a, or emitter 204 and detector 206 may be separate units. In one embodiment of the present invention, a sensor (e.g., 212a) may comprise a transmitter, a transducer, and a receiver, as is common with ultrasonic devices.

Figure 2C:
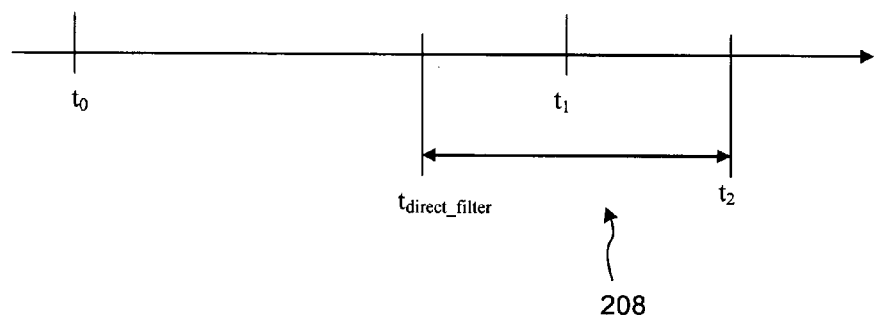
FIG. 2c shows a graph of a time period of a filter in accordance with an embodiment of the present invention.

FIG. 2c shows a graph of a time period of a filter in accordance with the embodiment of FIGS. 2a and 2b for removing unwanted signals. Signal 214a, to pick one signal as an example, is emitted at time $t_0$. The time required for signal 214a to travel from emitter 204 to object 210 and for echo 216a to return from object 210 to detector 206 corresponds to time value $t_1$. At a time $t_{direct\_filter}$, a direct filter 208 is applied. At a time $t_2$, the direct filter 208 is removed.

Direct filter 208 is applied to remove echo 216a after being detected by detector 206. Direct filter 208 may be applied for any length of time necessary to remove echo 216a. For example, in one embodiment of the present invention, direct filter 208 is applied from 0.5 ms prior to the detection of echo 216a until 0.5 ms after the detection of echo 216a. In other words, $t_{direct\_filter}$ corresponds to a time 0.5 ms before $t_1$, and $t_2$ corresponds to a time 0.5 ms after $t_1$. One skilled in the art will appreciate that the length of time that direct filter 208 is applied may be lengthened or shortened to accommodate for different conditions (e.g., temperature, humidity, etc.).

Figure 3A:
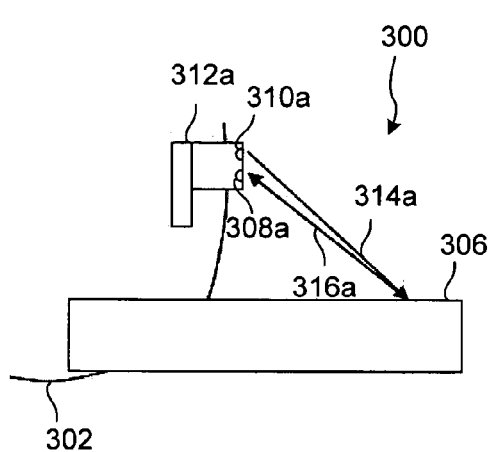
FIG. 3a shows a side view of a vehicular sensor system in accordance with an embodiment of the present invention.

FIG. 3a shows a side view of a vehicular sensor system 300 in accordance with another embodiment of the present invention. Specifically, FIG. 3a shows a side view of a sensor 312a mounted within a body of a vehicle 302. Sensor 312a emits a first signal 314a from a first emitter 310a, which is reflected by object 306. This first signal 314a is reflected by object 306 such that it is detected by a detector (not pictured) other than detector 308a. Similarly, an echo 316a originating from an emitter (not pictured) different than first emitter 310a is reflected by object 306 such that it travels from object 306 to sensor 312, where it is detected by detector 308a.

Figure 3B:
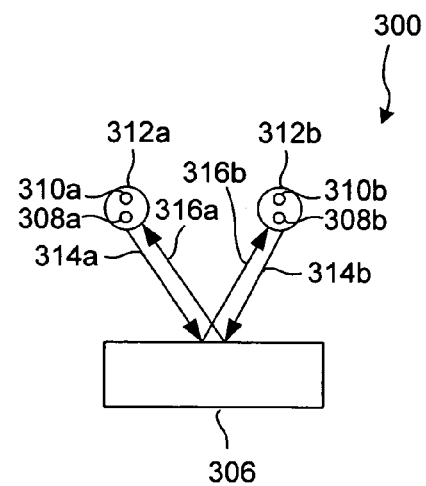
FIG. 3b shows an end view of a vehicular sensor system in accordance with an embodiment of the present invention.

FIG. 3b shows an end view of the vehicular sensor system 300 in accordance with the embodiment of FIG. 3a. Sensor 312b emits signal 314b from emitter 310b. Signal 314b is reflected by object 306 and returns as echo 316a to sensor 312a, where it is detected by detector 308a. Similarly, emitter 310a of sensor 312a emits signal 314a, which is reflected by object 306. Detector 308b detects echo 316b, which resulted from the reflection of signal 314a by object 306. Thus, each sensor 312a, 312b has detected an echo 316a, 316b that does not correspond to the signal 314a, 314b that it first sent. As with the prior embodiment, object 306 is fixed to the vehicle, and thus detection of this object by the sensor system is undesirable. Accordingly, filtering of signals reflected by object 306 that return as echoes to sensors 312a, 312b is desired.

Figure 3C:
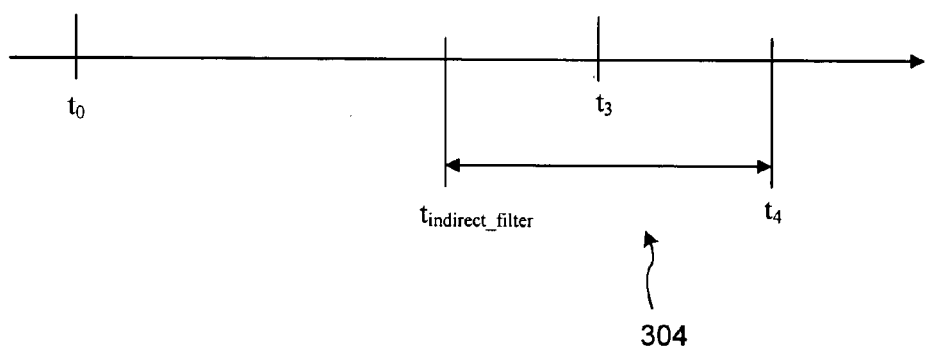
FIG. 3c shows a graph of a time period of a filter in accordance with an embodiment of the present invention.

FIG. 3c shows a graph of a time period of a filter in accordance with the embodiment of FIGS. 3a and 3b. Signal 314b, to pick one signal as an example, is emitted at time $t_0$. The time required for signal 314b to travel from emitter 308b to object 306 and for echo 316a to return from object 306 to detector 308a corresponds to time value $t_3$. At time $t_{indirect\_filter}$, an indirect filter 304 is applied. At a time $t_4$, the indirect filter 304 is removed.

Indirect filter 304 is applied to remove echo 316a after being detected by sensor 312a. As discussed above with reference to FIG. 2b, indirect filter 304 may be applied for any length of time necessary to remove echo 316a. In one embodiment of the present invention, indirect filter 304 is applied from 0.5 ms prior to the detection of echo 316a until 0.5 ms after the detection of echo 316a. In other words, $t_{indirect\_filter}$ corresponds to a time 0.5 ms before $t_3$, and $t_4$ corresponds to a time 0.5 ms after $t_3$. As with the prior embodiment, one skilled in the art will appreciate that the length of time that filter 304 is applied may be lengthened or shortened as determined necessary.

Figure 4:
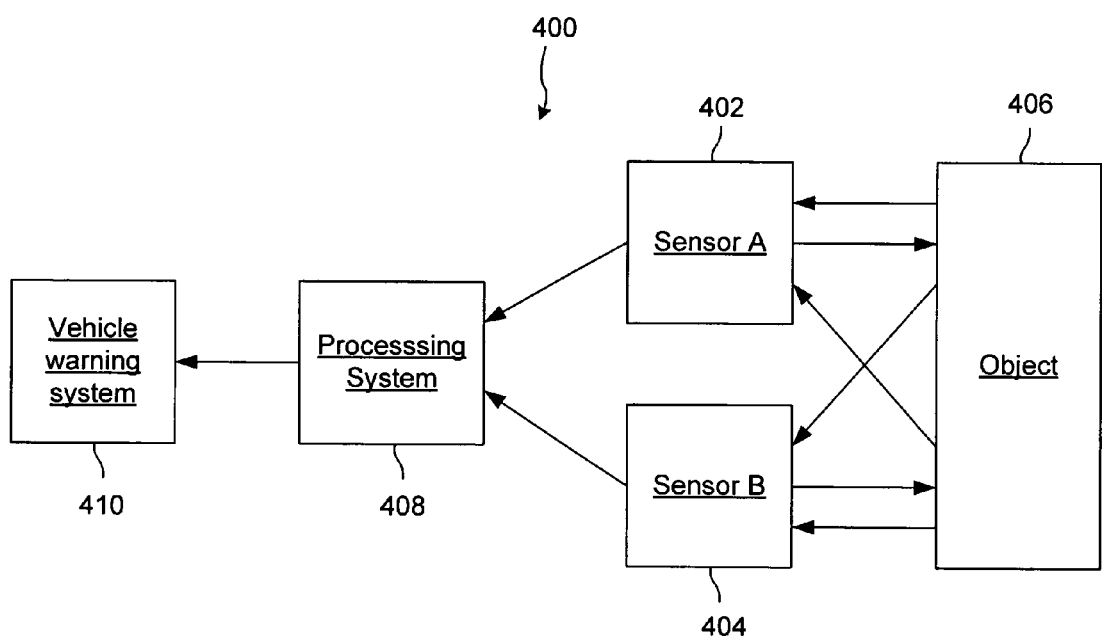
FIG. 4 shows a block diagram of a vehicular sensor system in accordance with an embodiment of the present invention.

FIG. 4 shows a block diagram of a vehicular sensor system 400 in accordance with an embodiment of the present invention. In FIG. 4, signals (indicated as arrows) are sent from sensor A 402 and sensor B 404 toward object 406. These signals are reflected by object 406 and return as echoes (indicated as arrows) to sensor A 402 and sensor B 404. Echoes detected by sensor A 402 and sensor B 404 are converted to electrical signals and sent to processing system 408, where they are filtered, if necessary. When necessary, processing system 408 issues a command to vehicle warning system 410 to alert the driver of a detected object.

As discussed with reference to FIGS. 2a-b and 3a-b, a signal may be returned to sensor A 402 or sensor B 404 as a direct echo or as an indirect echo. Processing system 408 evaluates detected echoes to determine whether they should be filtered. If an echo returned to processing system 408 should be filtered, that echo is in effect ignored by the processing system. If an echo is detected that is not filtered, the processing system interprets the echo as an object at a distance corresponding to a time for a signal to travel from an emitter to the object, to be reflected by the object, and to return as an echo to a detector.

When an electrical signal is interpreted as an object by processing system 408, a message is sent to the vehicle warning system 410 to alert the driver of the object. In one embodiment of the present invention, the warning is coded to indicate the distance of the object from the sensor. For example, in one embodiment of the present invention, the vehicle warning system 410 creates an audible beep every 0.5 seconds if a detected object is in a range from 3 feet to 6 feet from the sensor. The vehicle warning system 410 increases the frequency of the beeps to every 0.25 seconds if the object is between 1 and 3 feet from the sensor, and the vehicle warning system 410 issues a continuous tone if the object is less than one foot from the sensor. One skilled in the art will appreciate that a warning message may have other forms. For example, a visual display may be used separately or in conjunction with an audible system to alert the driver of an object in the path of the vehicle.

One skilled in the art will appreciate that processing system 408 may be a separate unit as shown in FIG. 4 or integrated with other vehicle systems. For example, processing system 408 may be integrated with vehicle warning system 410, or with other components (not pictured) commonly found in a vehicle.

In one embodiment of the present invention, signals sent from sensor A 402 and sensor B 404 to processing system 408 are coded, in a manner known to one skilled in the art, to identify the time elapsed between emission of a signal and detection of a corresponding echo, as well as the source of the signal. For example, a signal emitted from sensor B 404 that is reflected by object 406 and detected as an echo by sensor A 404 may be encoded differently than a signal emitted by sensor A 402 that is reflected by object 406 and detected as an echo by sensor A 404. Thus, an indirect echo may be distinguished from a direct echo, as well as from other indirect echoes. Similarly, multiple direct echoes received by a sensor may be distinguished from each other. In other words, each echo detected by a sensor is unique.

Figure 5:
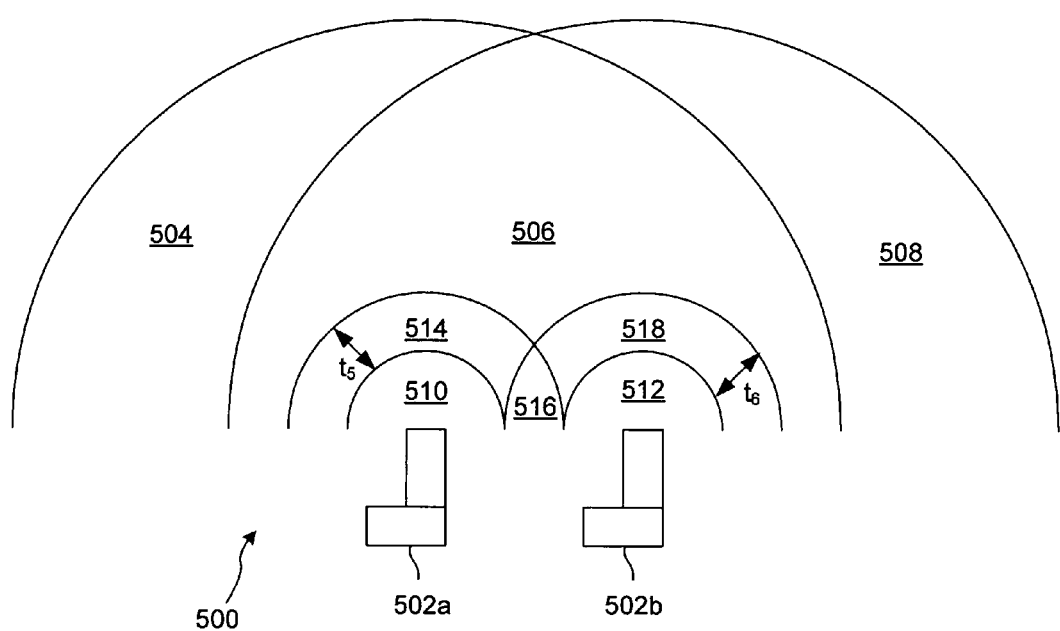
FIG. 5 shows a schematic view of a vehicular sensor system in accordance with an embodiment of the present invention.

FIG. 5 shows a schematic top view of a vehicular sensor system 500 in accordance with an embodiment of the present invention. Specifically, FIG. 5 shows a number of detection areas 504-516 that correspond to possible areas of detection of sensors 502a, 502b. Areas 504, 506, 510, 512, 514, 516, and 518 are within the range of detection of sensor 502a. Areas 506, 508, 510, 512, 514, 516, and 518 are within the range of detection of sensor 502b.

A filter is applied for sensor 502a corresponding to areas 514 and 516. The filter is configured to reject direct echoes (i.e., signals emitted from sensor 502a that are reflected by an object and return as echoes to sensor 502a) and indirect echoes (i.e., signals emitted from another sensor that are reflected by an object and return as an echo to sensor 502a) within time band $t_5$. Thus, any objects in areas 514, 516 that create echoes may be filtered by a processing system (e.g., processing system 408). Areas of detection 504, 506, 510, 512, and 518 are detected by sensor 502a and not filtered by a processing system.

Similarly, a filter is applied for sensor 502b corresponding to areas 516 and 518. The filter is configured to reject direct echoes and indirect echoes in time band $t_6$. Thus, any objects in areas 516, 518 detected by sensor 502b may be filtered by a processing system, while objects in areas 506, 508, 510, 512, and 514 detected by sensor 502b are not filtered by a processing system.

The overlap of regions of detection of sensors 502a and 502b includes areas 506, 510, and 512. Sensor 502a can additionally detect objects in areas 504 and 518. Sensor 502b can additionally detect objects in areas 508 and 514. Thus, the only filtered area in the regions of detection of sensors 502a, 502b is area 516. This allows unwanted echoes from objects in area 516 to be filtered. Thus, any objects within area 516 are not reported to a driver of a vehicle. If, for example, an owner of a vehicle attaches a trailer hitch to the vehicle in area 516, the sensor system for the vehicle can filter the trailer hitch in area 516 without losing integrity of other areas in the range of sensors 502a and 502b. One skilled in the art will appreciate that time bands of a filter can be tuned to reject echoes from a variety of objects and locations, including, for example, ground surfaces, curbs, step pads, trailer hitches, etc.

One skilled in the art will appreciate that any number of sensors may be used in a vehicular sensor system. For example, the filter for sensor 502a covering time band $t_5$ may additionally filter indirect echoes of a third sensor (not pictured) that also correspond to areas 514 and 516. In this manner, a region surrounding sensor 502a may be filtered with or without signals emitted from sensor 502a.

Figure 6:
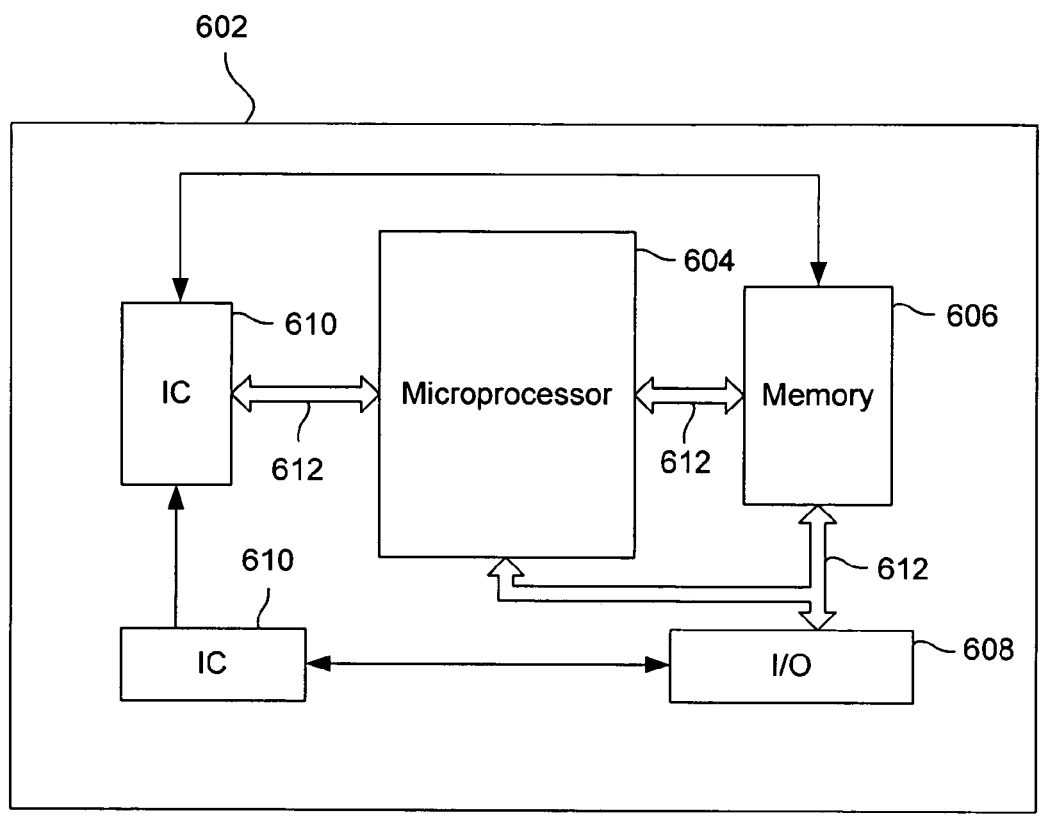
FIG. 6 shows a control system of a vehicular sensor system in accordance with an embodiment of the present invention.

FIG. 6 shows a processing system 602 of a vehicular sensor system in accordance with an embodiment of the present invention. Processing system 602 includes microprocessor 604, memory 606, I/O interface 608, integrated circuits 610, and communication paths 612 (e.g., wires, buses, etc.).

Instructions may be stored in memory 606 and executed by microprocessor 604 to train and use the vehicular sensor system. I/O interface 608 may cause an emitter to emit a signal, and may receive information relating to echoes detected by detectors in the vehicular sensor system. One skilled in the art will appreciate that processing system 602 may use analog or digital signals, or a combination thereof. Further, one skilled in the art will appreciate that the processing system may be implemented in hardware, software, or a combination of hardware and software.

Filter configurations for a vehicular sensor system may be coded at the time of design of the system. However, in one embodiment of the present invention, a vehicular sensor system may be configured to "learn" one or more particular filter configurations. For example, when a vehicle is assembled, it may be set to reject echoes corresponding to a step at the rear of the vehicle. After the vehicle is purchased, an owner of the vehicle may decide to add a trailer hitch to the vehicle. In order to prevent unwanted echoes from being reported by the sensor system, the user may configure the vehicular sensor system to reject echoes from the trailer hitch as well as from the step.

Figure 7:
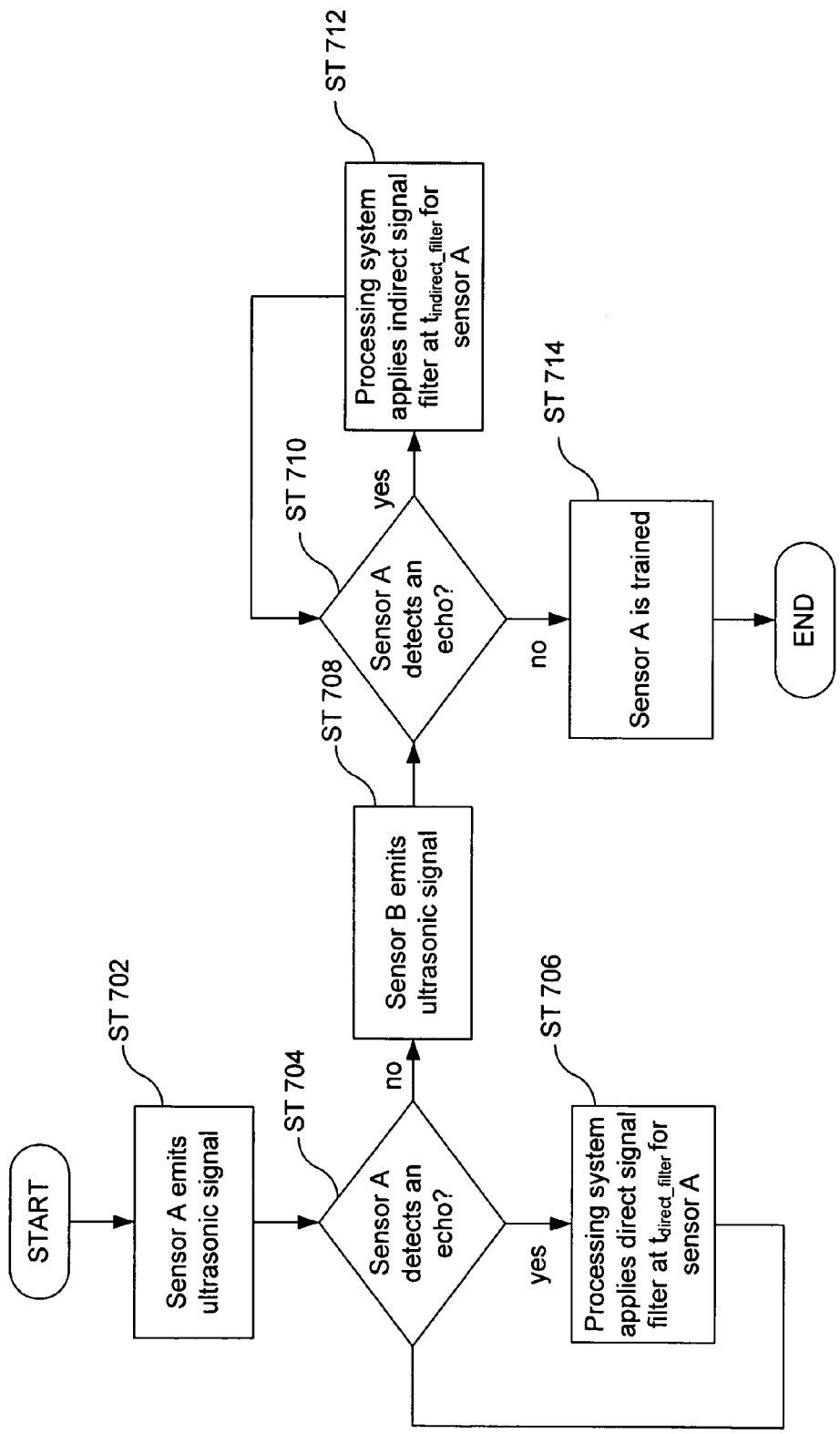
FIG. 7 shows a flowchart for teaching a vehicular sensor system in accordance with an embodiment of the present invention.

FIG. 7 shows a flowchart for training a sensor system in accordance with an embodiment of the present invention. The training occurs when no objects desired to be detected are present within the detection area. To train the system, a first sensor (sensor A) emits an ultrasonic signal (ST 702). If sensor A detects an echo (ST 704), the processing system applies a direct signal filter for time $t_{direct\_filter}$ for sensor A (ST 706). In other words, any signal sent by sensor A and returned to sensor A as an echo while the system is being trained will be filtered from detection when the system is used. If an echo is not detected at ST 704, or after the processing system determines that no additional echoes have been detected, a second sensor (sensor B) emits an ultrasonic signal (ST 708). A determination is then made as to whether sensor A detects an echo (ST 710). If one or more signals are detected, the processing system applies an indirect filter for time $t_{indirect\_filter}$ for sensor A (ST 712). In other words, any signal sent by sensor B and returned to sensor A as an echo while the system is being trained will be filtered from detection when the system is used. If an echo is not detected at ST 710, or after the processing system determines that no additional echoes have been detected, sensor A has been trained to filter objects detected within time periods $t_{direct\_filter}$ and $t_{indirect\_filter}$ from detection (ST 714), and the process ends. The training is then repeated in a similar manner using the next sensor (e.g., sensor B) in step ST 702.

Figure 8:
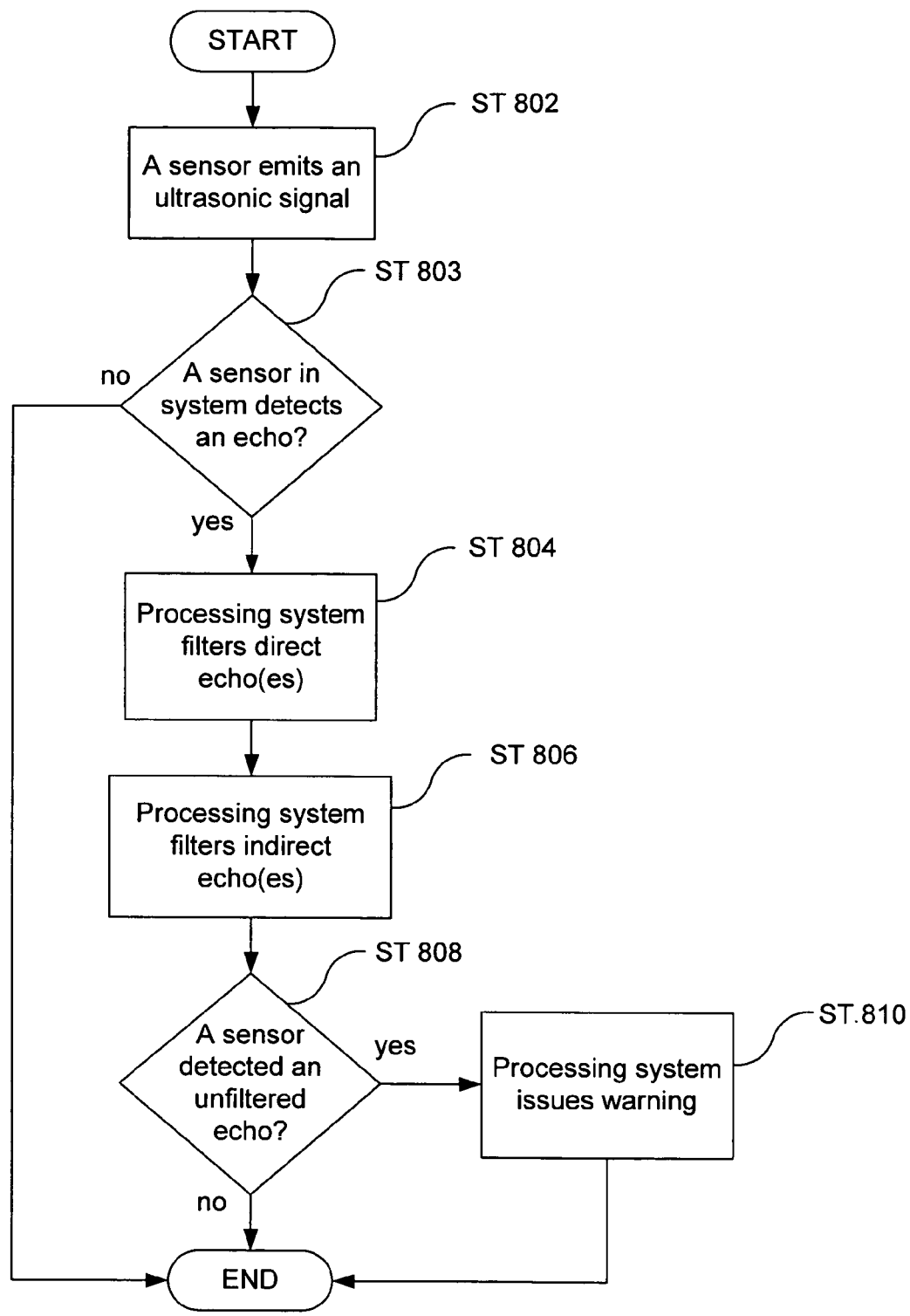
FIG. 8 shows a flowchart for using a vehicular sensor system in accordance with an embodiment of the present invention.

FIG. 8 shows a method for using a vehicular sensor system in accordance with an embodiment of the present invention. When the vehicular sensor system is activated, a sensor emits an ultrasonic signal (ST 802) for a determined period of time. If the sensor that emitted the signal or a sensor neighboring the sensor that emitted the signal detects an echo (ST 803), the process continues to ST 804. Otherwise, the process ends. In ST 804, direct echoes received by the sensor that emitted the signal are filtered according to established filters for direct echoes. Proceeding to ST 806, indirect echoes received by sensors neighboring the sensor that emitted the signal are filtered according to established filters for indirect echoes. In ST 808, a determination is made as to whether an echo has been detected by a sensor that was not filtered by a filter for direct echoes or by a filter for a indirect echoes. If no such echo is present, the process ends. If such an echo is present, the processing system sends a signal to a vehicle warning system corresponding to the position of the object, and a warning is issued (ST 810). This process may be repeated in a similar manner for any sensor in the system One skilled in the art will appreciate that any number of signals may be sent from a sensor. For example, in one embodiment of the present invention, the sensor discussed with reference to FIG. 8 may emit a continuous stream of signals as long as the sensor system is in operation. Additionally, one skilled in the art will appreciate that sensors may emit signals in any order. For example, in one embodiment of the present invention, a group of sensors may emit pulses of signals in a sequential pattern. In other words, a first sensor may emit a pulse for a determined time. The system may then wait for that sensor and other sensors in the system to detect any echoes resulting from the pulse. After all echoes have been detected and reported (if necessary), a second sensor emits a pulse. After any echoes corresponding to the signal emitted by the second sensor are detected and reported (if necessary), a third sensor may emit a pulse according to the above described process. This process may be repeated for any number of sensors in the system. After all echoes related to the emission of a signal from the last sensor in the system have been detected, the process may begin anew with the first sensor.

One skilled in the art will appreciate that the method shown in FIG. 8 may be repeated as long as the vehicular sensor system is in operation. Further, in one embodiment of the present invention, a sensor may emit an ultrasonic pulse as long as the vehicle is in a certain state. For example, the vehicular sensor system may operate while the vehicle is in reverse, or while the vehicle is traveling above or below a certain speed.

In one or more embodiments of the present invention, echoes at a defined time or in a definable time duration may be filtered by a definable filter width. Further, in one or more embodiments of the present invention, direct echoes, where the sending and receiving sensor is the same, may be filtered from detection. Further, in one or more embodiments of the present invention, indirect echoes, where the sending and receiving sensors are different, may be filtered from detection.

In one or more embodiments of the present invention, as a vehicular sensor system may process direct echoes and indirect echoes, objects between sensors that are not directly detected by a sensor may be filtered after detection.

In one or more embodiments of the present invention, a vehicular sensor system may filter detections in a specific area of the detection area of the system. Accordingly, in one or more embodiments of the present invention, detection areas of multiple sensors that overlap allow objects in the filtered area of one sensor to be detected by another sensor.

In one or more embodiments of the present invention, an actual location of an object may detected by multiple sensors in a vehicular sensor system. Additionally, in one or more embodiments of the present invention, the object may be filtered without warning a user of the presence of the object.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for filtering an object by a vehicular sensor system, comprising:
   emitting a first signal;
   detecting a first echo, the first echo comprising at least a portion of the first signal reflected by the object;
   emitting a second signal;
   detecting a second echo, the second echo comprising at least a portion of the second signal reflected by the object; and
   filtering a time band encompassing a first time value of the first echo and a second time value of the second echo.

2. The method of claim 1, further comprising:
   emitting a third signal;
   detecting a third echo, the third echo comprising at least a portion of the third signal reflected by an additional object;
   detecting a third time value of the third echo; and
   issuing a warning in response to detecting the third time value.

3. The method of claim 1, wherein the second echo is detected by a first detector and the first echo is detected by a second detector.

4. The method of claim 3, wherein the first and second signals are emitted by a first emitter.

5. The method of claim 3, wherein the first signal is emitted by a first emitter and the second signal is emitted by a second emitter.

6. The method of claim 5, wherein the first emitter is co-located with the first detector and the second emitter is co-located with the second detector.

7. The method of claim 1, wherein the first and second echoes are detected by a first detector.

8. The method of claim 7, wherein the first signal is emitted by a first emitter and the second signal is emitted by a second emitter.

9. The method of claim 1, wherein filtering is implemented by an indirect filter.

10. The method of claim 1, wherein filtering is implemented by a direct filter.

11. A method for filtering an object by a vehicular sensor system, comprising:
   emitting a first signal and a second signal from a first emitter;
   detecting a first echo by a first detector, the first echo comprising at least a portion of the first signal;
   detecting a second echo by either the first detector or a second detector, the second echo comprising at least a portion of the second signal;
   detecting a plurality of objects based on detecting the first echo and detecting the second echo; and
   filtering a time band encompassing a first time value of the first echo and a second time value of the second echo so as to filter at least one of the plurality of objects after detecting the plurality of objects.

12. The method of claim 11, further comprising:
issuing a warning in response to detecting another of the plurality of objects.

13. A vehicular sensor system adapted to filter an object, comprising:
a first emitter configured to emit a first signal;
a second emitter configured to emit a second signal;
at least one detector configured to detect echoes;
   wherein at least one of the detectors is configured to detect a first echo corresponding to the first signal reflected by the object;
   wherein at least of the one detectors is configured to detect a second echo corresponding to the second signal reflected by the object; and
a processor system configured to filter a continuous time band encompassing a first time value of the first echo and a second time value of the second echo.

14. The system of claim 13, wherein:
at least one of the detectors is further configured to detect a third echo corresponding to a third signal emitted by one of the first emitter and the second emitter;
the processor system is further configured to detect a third time value corresponding to the third echo; and
the processor system is further configured to issue a warning in response to the third time value.

15. The system of claim 13, wherein the second echo is detected by a first detector and the first echo is detected by a second detector.

16. The system of claim 15, wherein the first and second signals are emitted by a unified emitter comprising the first and second emitters.

17. The system of claim 13, wherein the first and second echoes are detected by a first detector.

18. The system of claim 13, wherein the at least one detector comprises a first detector and a second detector, and wherein the first detector is co-located with the first emitter and the second detector is co-located with the second emitter.

19. The vehicular sensor system of claim 18, wherein the first emitter and the first detector are embodied in a first sensor and the second emitter and the second detector are embodied in a second sensor.

* * * * *